(12) United States Patent
Muto

(10) Patent No.: US 7,497,673 B2
(45) Date of Patent: Mar. 3, 2009

(54) SCROLL FLUID MACHINE HAVING FORCED CONVECTION GENERATING PORTION

(75) Inventor: Ryusuke Muto, Yokohama (JP)

(73) Assignee: Anest Iwata Corporation, Yokohama-shi, Kanagawa (JP)

( * ) Notice: Subject to any disclaimer, the term of this patent is extended or adjusted under 35 U.S.C. 154(b) by 0 days.

(21) Appl. No.: 11/690,396

(22) Filed: Mar. 23, 2007

(65) Prior Publication Data
US 2007/0224069 A1    Sep. 27, 2007

(30) Foreign Application Priority Data
Mar. 27, 2006    (JP)    ............................. 2006-084497

(51) Int. Cl.
*F01C 1/02* (2006.01)
*F03C 2/00* (2006.01)
*F04C 2/00* (2006.01)

(52) U.S. Cl. ....................... 418/55.1; 418/55.2; 418/60; 418/94; 418/101; 418/179; 165/84; 165/104.26; 165/104.28

(58) Field of Classification Search ................ 418/55.1, 418/55.2, 55.6, 60, 94, 101, 179; 165/84, 165/104.26, 104.28
See application file for complete search history.

(56) References Cited

U.S. PATENT DOCUMENTS

| 5,551,852 | A  | * | 9/1996  | Saito et al. ..................... 418/94 |
| 6,109,897 | A  |   | 8/2000  | Haga |
| 6,186,755 | B1 | * | 2/2001  | Haga ......................... 418/55.1 |
| 6,953,330 | B1 | * | 10/2005 | Muto ......................... 418/55.1 |

FOREIGN PATENT DOCUMENTS

| JP | 57208319 A    | * | 12/1982 |
| JP | 08004667 A    | * | 1/1996  |
| JP | 2001298018 A  | * | 10/2001 |

* cited by examiner

*Primary Examiner*—Theresa Trieu
(74) *Attorney, Agent, or Firm*—Lowrie, Lando & Anastasi, LLP.

(57) ABSTRACT

In a scroll fluid machine, a driving shaft has an eccentric axial portion around which an orbiting scroll revolves while the orbiting scroll engages with a fixed scroll. A cooling path extends through the driving shaft to a gap between the outer circumferential surface of the eccentric axial portion and the inner circumferential surface of an axial hole of the orbiting scroll. A cooling gas is introduced into the cooling path to cool bearings around the driving shaft. A forced convection generating portion is provided on the driving shaft for sucking the cooling gas into the gap and discharging the gas.

5 Claims, 2 Drawing Sheets

SCROLL FLUID MACHINE HAVING FORCED CONVECTION GENERATING PORTION

This application claims foreign priority benefits under 35 U.S.C. § 119(a)-(d) of the Japan application number JP2006-084497, filed Mar. 27, 2006.

BACKGROUND OF INVENTION

1. Field of Invention

The present invention relates to a scroll fluid machine such as a scroll vacuum pump or a scroll compressor.

2. Discussion of Related Art

U.S. Pat. No. 6,109,897A discloses a scroll fluid machine that comprises a fixed scroll and an orbiting scroll rotatably mounted to an eccentric axial portion of a driving shaft, a cooling path extending through the driving shaft axially, a cooling gas being introduced in the cooling path to cool bearings and sealing members between the orbiting scroll and the driving shaft.

However, in the scroll fluid machine, a cooling gas is sucked into and discharged from the cooling path by natural convection or stirring thereby making it impossible for the parts to be cooled effectively.

SUMMARY OF INVENTION

In view of the disadvantage in the prior art, it is an object of the invention to provide a scroll fluid machine in which a cooling gas is sucked and discharged by forced convection flow to cool parts of the scroll fluid machine effectively.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

The features and advantages of the invention will become more apparent from the following description with respect to an embodiment as shown in accompanying drawings wherein.

DETAILED DESCRIPTION

Figure 1:
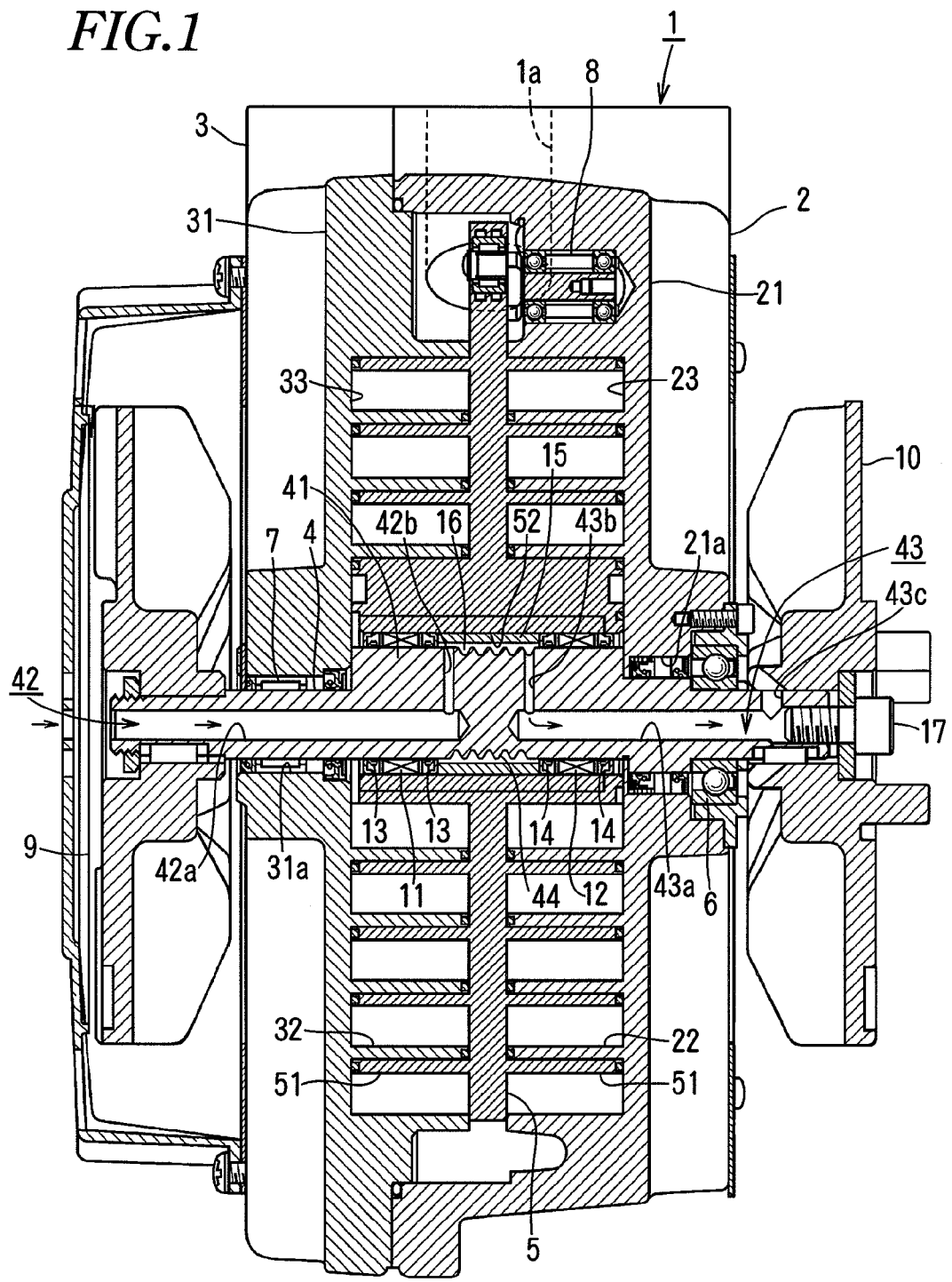
FIG. 1 is a vertical sectional side view of an embodiment of a scroll fluid machine according to the present invention.
Figure 2:
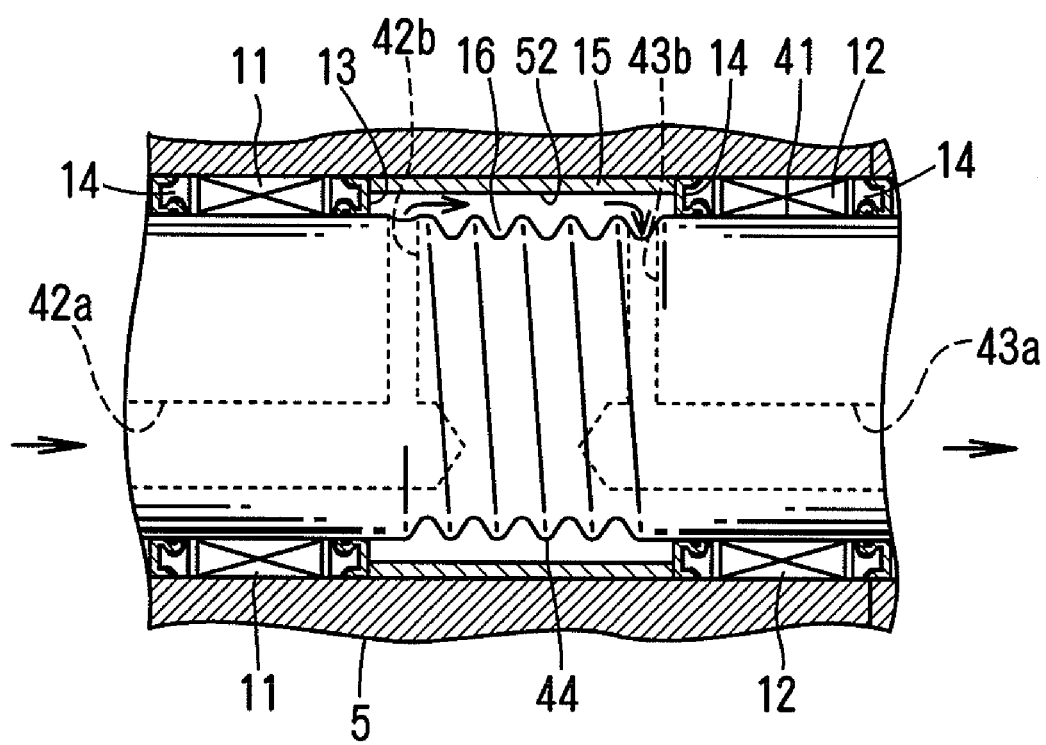
FIG. 2 is an enlarged side view of the main part of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

A housing 1 comprises a rear casing 2 and a front cover 3. Close to the outer circumference, an intake port 1a is formed for sucking a gas into the housing 1, and close to the center, a discharge port (not shown) is formed for discharging compressed gas from the housing 1.

The casing 2 and cover 3 have circular end plates 21, 31 respectively, which has spiral or involute-curve fixed wraps 22, 32 to constitute fixed scrolls 23, 33. Between the fixed scrolls 23 and 33, an orbiting scroll 5 is rotatably mounted on an eccentric axial portion 41 of a driving shaft 4.

The driving shaft 4 is connected at the rear end to a motor (not shown) as driving source and rotatably mounted in axial holes 21a, 31a at the center of the fixed end plates 21, 31 via bearings 6, 7.

The orbiting scroll 5 is rotatably mounted to the eccentric axial portion 41 of the driving shaft 4 in an axial hole 52 at the center and has orbiting wraps 51, 51 engaging with fixed wraps 22, 32 by 180 degrees, and is connected to the fixed end plate 21 with three known pin-crank-type self-rotation-preventing devices 8 equally spaced.

With rotation of the driving shaft 4 by the motor, the orbiting scroll 5 is revolved thereby allowing a compression chamber defined by the fixed wraps 22, 32 and the orbiting wraps 51, 51 to reduce in volume towards the center. A gas sucked through the intake port is gradually compressed and discharged from the discharge port in the middle.

At the front and rear ends of the driving shaft 4 projecting from the fixed end plates 31, 21, front and rear cooling fans 9, 10 rotates with the driving shaft 4 to produce air flow in a centrifugal direction.

Between the inner circumferential surface of the axial hole 52 of the orbiting scroll 5 and the outer circumferential surface of the eccentric axial portion 41 of the driving shaft 4, front and rear bearings 11, 12 are mounted to allow the driving shaft 4 to rotate smoothly with respect to the orbiting scroll 5.

Between the front and rear sealing members 13 and 14 in the axial hole 52 in the orbiting scroll 5, an annular member 15, such as Cu, having thermal conductivity higher than the orbiting scroll 5 made of Al alloy, is fixed to rotate together with the orbiting scroll 5. Preferably, the annular member 15 may be a bearing, and a gap between the outer circumferential surface of a spiral groove 44 and the inner circumferential surface of the annular member 15 is determined as close as possible.

Through the driving shaft 4, the first cooling path 42 allows a cooling gas to flow into a gap 16 between the outer circumferential surface of the eccentric axial portion 41 and the annular member 15 from the front end, and the second cooling path 43 allows the cooling gas to discharge from the gap 16 to outside through the rear end of the driving shaft 4.

The first cooling path 42 comprises the first axial hole 42a which axially extends from the rear end of the driving shaft 4, and the first radial hole 42b which radially extends from the first axial hole 42a and opens to the outer circumferential surface of the eccentric axial portion 41.

The second cooling path 43 comprises the second axial hole 43a which axially extends from the rear end of the driving shaft 4 to the middle of the eccentric axial portion 41, and the second radial hole 43b which radially extends from the second axial hole 43a and opens to the outer circumferential surface of the eccentric axial portion 41.

The rear end of the second axial hole 43b of the second cooling path 43 is closed by a closing member 17, and a plurality of discharge holes 43c are radially formed close to the rear end of the second axial hole 43a.

The first radial hole 42b and second radial hole 43b are disposed in the eccentric axial portion 41 axially apart from each other within the gap 16.

On the outer circumferential surface of the eccentric axial portion 41 between the first radial hole 42b and the second radial hole 43b, a spiral groove 44 is formed and surrounded by the annular member 15. A thread of the spiral groove 44 is formed in a direction contrary to a rotational direction of the driving shaft 4 to act as forced convection generating portion.

With rotation of the driving shaft 4, the spiral groove 44 generates forced convection axially so that a cooling gas is sucked into the gap 16 through the first cooling path 42 and discharged from the discharge hole 43*c* through the second cooling path 43.

Flow of the cooling gas with rotation of the driving shaft 4 will be described in detail.

When the driving shaft 4 rotates, the spiral groove 44 rotates in the gap 16 to produce forced convection by screw-pump action to allow the cooling gas to flow rearward axially.

Thus, as shown in arrows in the figures, the cooling gas is sucked from the front end of the first axial hole 42*a* and introduced into the gap 16 through the first radial hole 42*b*. The cooling gas introduced in the first cooling path 42 cools the front part of the driving shaft 4.

While the cooling gas introduced in the gap 16 directly cools the eccentric axial portion 41, the annular member 15, the front and rear bearings 11, 12 and the sealing members 13, 14, the gas is forwarded rearwards and discharged from the discharge hole 43*c* through the second axial hole 43*a* of the second cooling path 43. The cooling gas introduced in the second cooling path 43 cools the rear part of the driving shaft 4.

The annular member 15 has thermal conductivity higher than the orbiting scroll 5. Thus, cooling in the gap 16 is efficiently transferred to the center of the orbiting scroll 5 which is effectively cooled, thereby improving durability of the front and rear bearings 11, 12 and sealing members 13, 14.

When the annular member 15 is a sliding bearing, the inner circumferential surface of the annular member 15 can be approached to the outer circumference of the spiral groove 44, so that the cooling gas is forwarded rearwards efficiently by flow of forced convection by a screw-pump action to enable efficient cooling.

The embodiment relates to a both-side scroll fluid machine in which the both-side orbiting scroll 5 is disposed between the two fixed scrolls 23 and 33, but the present invention may apply to a one-side scroll fluid machine in which a one-side fixed scroll engages with a one-side orbiting scroll.

The foregoing relates to an embodiment of the invention. Various changes and modifications may be made by a person skilled in the art without departing from the scope of claims wherein:

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A scroll fluid machine comprising:
a driving shaft having an eccentric axial portion;
a fixed scroll; and
an orbiting scroll rotatably mounted to the eccentric axial portion of the driving shaft and engaging with the fixed scroll, the orbiting scroll having an axial hole, a gap being formed in the driving shaft between an outer circumferential surface of the eccentric axial portion and an inner circumferential surface of the axial hole, a first cooling path extending through the driving shaft to introduce a cooling gas into the gap, a second cooling path extending through the driving shaft to discharge the cooling gas from the gap, a forced convection generating portion sucking the cooling gas into the gas through the first cooling path and forwarding the gas to the second cooling path, the first cooling path comprising a first axial hole and a first radial hole connecting the first axial hole to the gap, the second cooling path comprising a second axial hole and a second radial hole connecting the gap to the second axial hole, the forced convection generating portion comprising a spiral groove on the outer circumferential surface of the eccentric axial portion of the driving shaft, the spiral groove being formed between the first and second radial holes on the outer circumferential surface of the eccentric axial portion of the driving shaft.

2. The scroll fluid machine of claim 1, further comprising an annular member fixed on the inner circumferential surface of the axial hole of the orbiting scroll to surround the spiral groove, said annular member having higher conductivity than the orbiting scroll.

3. The scroll fluid machine of claim 2, wherein the annular member comprises a sliding bearing.

4. The scroll fluid machine of claim 2, wherein the orbiting scroll is made of Al and the annular member is made of Cu.

5. The scroll fluid machine of claim 1, wherein the spiral groove has thread having a direction contrary to a direction of rotation of the driving shaft.

* * * * *